US012809288B2

(12) United States Patent
Tajiri

(10) Patent No.: US 12,809,288 B2
(45) Date of Patent: Nov. 24, 2026

(54) IMAGE FORMING APPARATUS THAT REDUCES IMAGE SHIFT

(71) Applicant: CANON KABUSHIKI KAISHA, Tokyo (JP)

(72) Inventor: Tsuyoshi Tajiri, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 298 days.

(21) Appl. No.: 18/744,913

(22) Filed: Jun. 17, 2024

(65) Prior Publication Data

US 2024/0427261 A1 Dec. 26, 2024

(30) Foreign Application Priority Data

Jun. 20, 2023 (JP) ................................ 2023-101185

(51) Int. Cl.

*G03G 15/043* (2006.01)
*G03G 15/00* (2006.01)

(52) U.S. Cl.

CPC ....... *G03G 15/043* (2013.01); *G03G 15/5041* (2013.01); *G03G 2215/0409* (2013.01)

(58) Field of Classification Search

None
See application file for complete search history.

(56) References Cited

U.S. PATENT DOCUMENTS 6,351,620 B1 * 2/2002 Miyabe .............. G03G 21/1885 399/111
2008/0259297 A1 * 10/2008 Kawakubo .......... G03F 7/70425 355/52
2009/0060544 A1 * 3/2009 Kawada ............ G03G 15/0131 399/51
2016/0246208 A1 * 8/2016 Nagasaki .............. H04N 1/387
2018/0288284 A1 10/2018 Yasaki
2022/0234850 A1 * 7/2022 Tokuma ................. B65H 5/062

FOREIGN PATENT DOCUMENTS

JP 6867847 B2 5/2021

* cited by examiner

*Primary Examiner* — Darryl V Dottin
(74) *Attorney, Agent, or Firm* — ROSSI, KIMMS & McDOWELL LLP

(57) ABSTRACT

An apparatus comprises a photosensitive member, an exposure light source including a plurality of light-emitting units that are arranged parallel to a rotation axis of the photosensitive member and that emit light that exposes the photosensitive member, and a controller configured to generate image data that is a group of bit data controlling lighting and extinguishing of the plurality of light-emitting units and that corresponds to an image, and to insert and/or remove the bit data in the image data. The image includes a test image for obtaining a shift amount in an image formation position relative to a reference position. The image data includes test image data corresponding to the test image. The controller does not insert and/or remove the bit data in a region of the image data that corresponds to the test image data.

13 Claims, 15 Drawing Sheets

| BLOCK NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| NUMBER OF INSERTED PIXELS | 1 | 1 | 0 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 2 | 1 |

IMAGE FORMING APPARATUS THAT REDUCES IMAGE SHIFT

BACKGROUND OF THE INVENTION

Field of the Invention

The present invention relates to an image forming apparatus that reduces image shift.

Description of the Related Art

The position of an image formed on a sheet by an image forming apparatus may shift in a direction orthogonal to the conveyance direction of the sheet (a main scanning direction). This shift results in the image being enlarged or reduced in the main scanning direction. Japanese Patent No. 6867847 proposes detecting an image shift amount in the main scanning direction using a test image, and then correcting image data according to the shift amount.

The image shift amount in the main scanning direction is reduced by adding pixels to or removing pixels from a plurality of pixels constituting the image data. However, adding or removing pixels to or from a test image produces step parts in the test image at the positions where the pixels have been added or removed. If these step parts are read by a sensor and the image data is corrected based on the reading result, the image shift in the main scanning direction may conversely become more apparent.

SUMMARY OF THE INVENTION

The present disclosure provides an image forming apparatus comprising a photosensitive member that is rotationally driven, an exposure light source including a plurality of light-emitting units that are arranged parallel to a rotation axis of the photosensitive member and that emit light that exposes the photosensitive member, and at least one controller configured to generate image data that is a group of bit data controlling lighting and extinguishing of the plurality of light-emitting units and that corresponds to an image, and to insert and/or remove the bit data in the image data. The image includes a test image for obtaining a shift amount in an image formation position relative to a reference position. The image data includes test image data corresponding to the test image. The at least one controller does not insert and/or remove the bit data in a region of the image data that corresponds to the test image data.

Further features of the present invention will become apparent from the following description of exemplary embodiments (with reference to the attached drawings).

DESCRIPTION OF THE EMBODIMENTS

Figure 1:
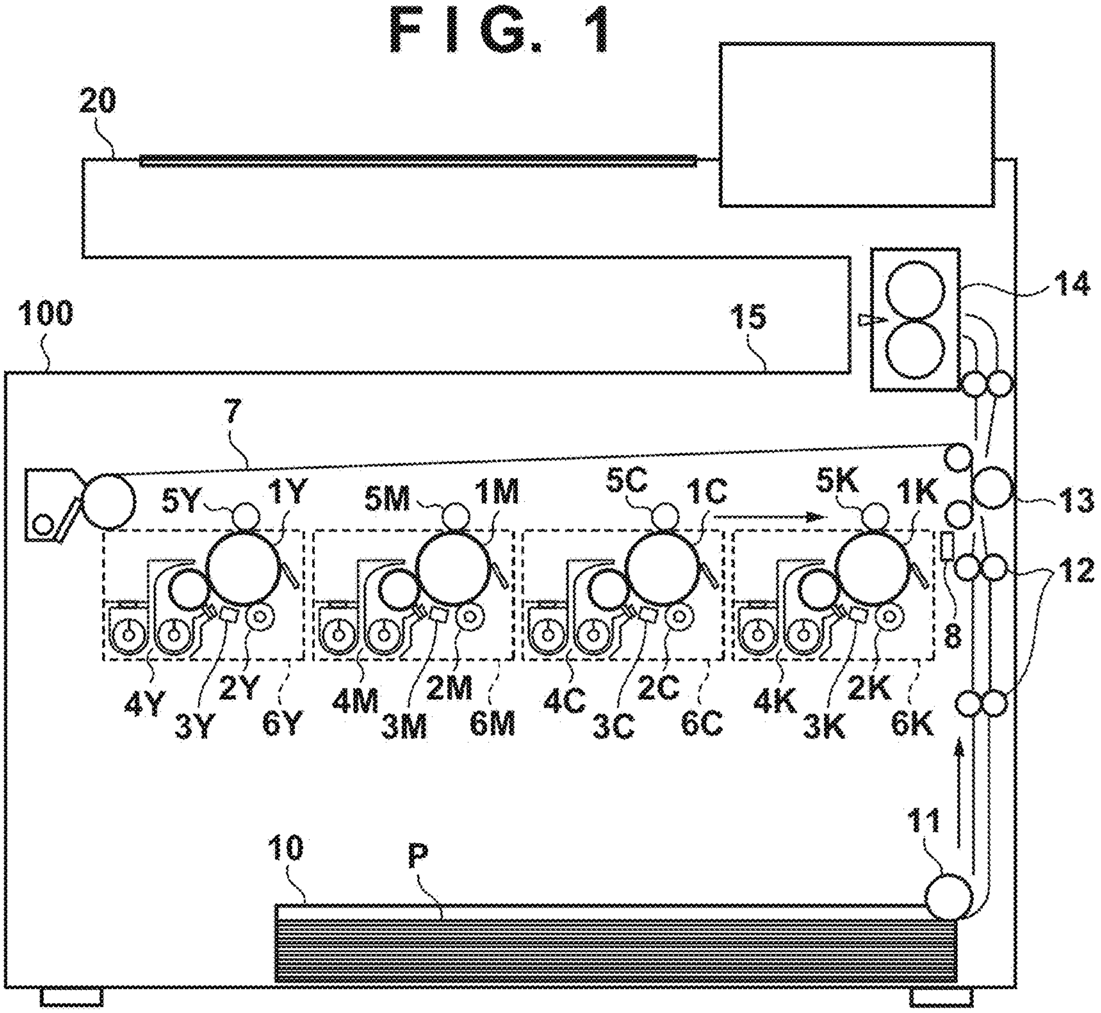
FIG. 1 is a diagram illustrating an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(1) Image Forming Apparatus

FIG. 1 illustrates an electrophotographic image forming apparatus 100. The image forming apparatus 100 is a color printer (e.g., a multifunction peripheral (MFP)) that forms an image on a sheet P based on image data generated by a reading apparatus 20, for example. However, the image forming apparatus 100 may be an image forming apparatus that forms monochromatic images. In FIG. 1, the letters Y, M, C, and K appended to the reference signs mean “yellow”, “magenta”, “cyan”, and “black”, respectively. The letters Y, M, C, and K will be omitted from the reference signs when describing matters common to all four colors.

Each of image forming units 6Y, 6M, 6C, and 6K includes a photosensitive drum 1, a charger 2, an exposure device 3, a developer 4, and a primary transfer device 5. The photosensitive drum 1 is an image carrier that is rotationally driven while holding an electrostatic latent image and a toner image. The charger 2 uniformly charges the surface of the photosensitive drum 1. The exposure device 3 forms an electrostatic latent image on the surface of the photosensitive drum 1 by irradiating the surface of the photosensitive drum 1 with light based on the image data. The exposure device 3 may be a laser scanner-type device having a laser light source and a rotating polygonal mirror, or an LED-type device having a plurality of light-emitting diodes (LEDs). Regardless of the type, sub scanning is achieved by rotating the photosensitive drum 1. With a laser scanner-type device, main scanning is achieved by moving a laser beam parallel to a main scanning direction. With an LED-type device, main scanning is achieved by the plurality of LEDs, which are arranged parallel to the main scanning direction, irradiating the photosensitive drum 1 with light. Note that the main scanning direction is the direction parallel to the rotation axis of the photosensitive drum 1. The main scanning direction may also be called a “rotation axis direction”. A sub scanning direction is a direction orthogonal to the main scanning direction. The developer 4 uses toner to develop the electrostatic latent image and forms a toner image. The primary transfer device 5 transfers the toner image to an intermediate transfer member 7. The primary transfer device 5 may be a roller or a blade that presses the intermediate transfer member 7 against the photosensitive drum 1. The intermediate transfer member 7 is an endless belt, for example. A full-color image is formed by transferring each of Y, M, C, and K toner images onto the intermediate transfer member 7 in a superimposed manner. When the intermediate transfer member 7 rotates, the toner image is conveyed to a secondary transfer part.

A sheet cassette 10 is a holding unit that holds a large number of sheets P. A feed roller 11 conveys the sheets P held in the sheet cassette 10 downstream. "Downstream" refers to being downstream in a conveyance direction of the sheets P. A plurality of conveyance roller pairs 12 are disposed along a conveyance path. Each conveyance roller pair 12 conveys the sheet P further downstream.

A secondary transfer nip (the secondary transfer part) is formed by a secondary transfer roller 13 and the intermediate transfer member making contact with each other. The toner image is transferred from the intermediate transfer member 7 to the sheet P as a result of the toner image and the sheet P passing through the secondary transfer nip. A fixer 14 is disposed downstream from the secondary transfer part.

The fixer 14 fixes the toner image onto the sheet P by applying heat and pressure to the sheet P and the toner image. The fixer 14 then discharges the sheet P to a discharge tray 15.

An optical sensor 8 is disposed between the black image forming unit 6K and the secondary transfer part. The optical sensor 8 detects a test image conveyed by the intermediate transfer member 7. The test image is used, for example, to correct formation positions of the Y, M, C, and K toner images (e.g., a writing position in the main scanning direction, a writing position in the sub scanning direction, an image magnification in the main scanning direction, and an image magnification in the sub scanning direction). Note that image data serving as the source of the test image may be called "test image data". Note also that of the plurality of bit data constituting the image data, the bit data corresponding to the test image may be called "test image data".

(2) Structure of Exposure Device (Exposure Head)

Figure 2A:
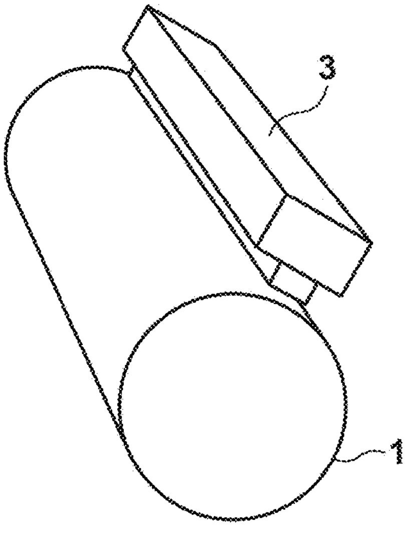
FIGS. 2A to 2C are diagrams illustrating an exposure device.
Figure 2B:
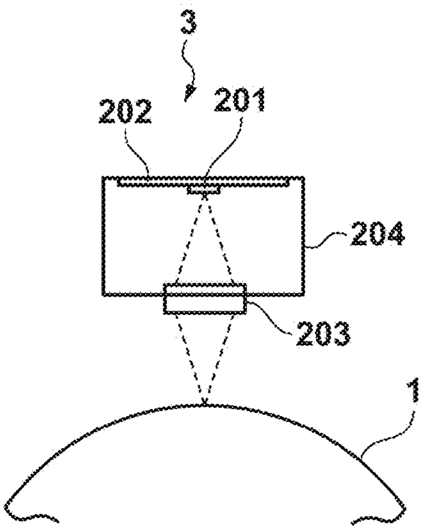
Figure 2C:
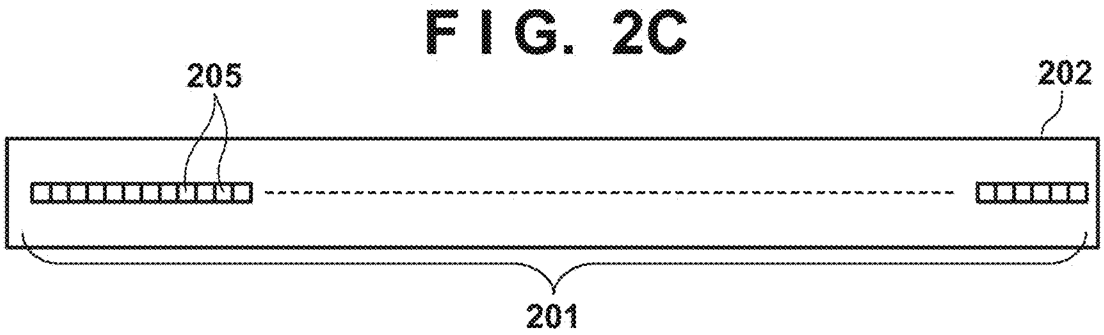

FIG. 2A is a perspective view of the exposure device 3 that exposes the photosensitive drum 1. FIG. 2B is a schematic cross-sectional view of the photosensitive drum 1 and the exposure device 3. The exposure device 3 includes a light-emitting element group 201, a printed circuit board 202, a rod lens array 203, and a housing 204. The light output from the light-emitting element group 201, which is mounted on the printed circuit board 202, is focused by the rod lens array 203 and emitted onto the surface of the photosensitive drum 1. The printed circuit board 202 and the rod lens array 203 are fixed to the housing 204. As illustrated in FIG. 2C, the light-emitting element group 201 mounted on the printed circuit board 202 includes a plurality of light-emitting elements 205. The printed circuit board 202 in this example includes a light-emitting element group 201 constituted by only a single row, but the light-emitting element group 201 may be constituted by a plurality of rows. In this case, a plurality of main scanning lines can be drawn at the same time.

(3) Optical Sensor (Image Position Detector)

Figure 3:
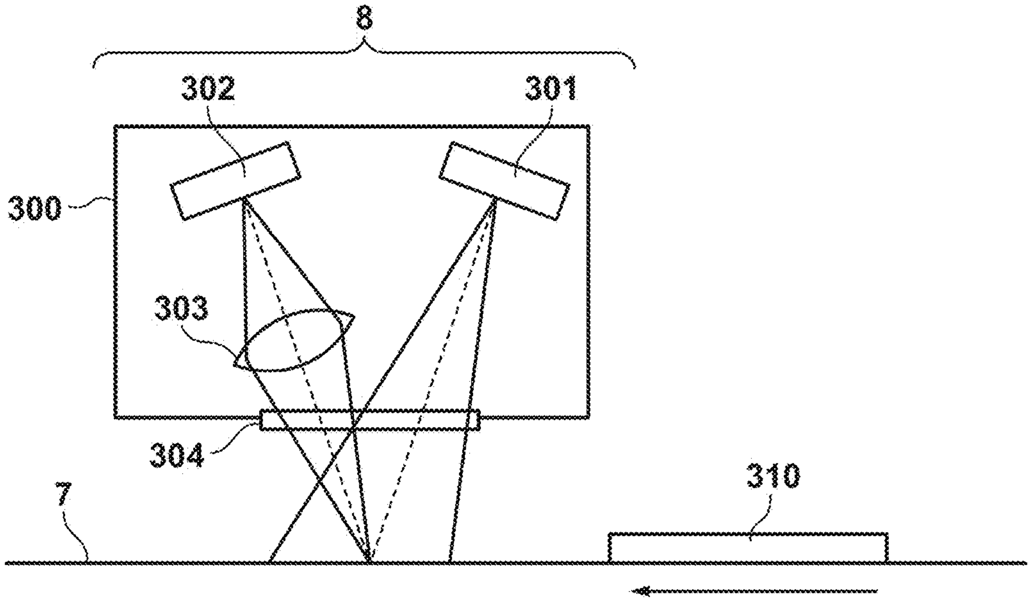
FIG. 3 is a diagram illustrating an optical sensor.

FIG. 3 is a cross-sectional view of the optical sensor 8. A housing 300 holds a light-emitting element 301, a light-receiving element 302, a lens 303, and a window 304. The light-emitting element 301 is an LED that emits light toward the surface of the intermediate transfer member 7. The light output from the light-emitting element 301 passes through the window 304 onto the intermediate transfer member 7 or a test image 310 on the intermediate transfer member 7, and is reflected thereby. The reflected light from the intermediate transfer member 7 or the test image 310 passes through the window 304 and is further focused by the lens 303. The lens 303 focuses the light from the intermediate transfer member 7 or the test image 310 onto the light-receiving element 302. The light-receiving element 302 outputs a detection signal based on the result of detecting the test image 310.

Figure 4A:
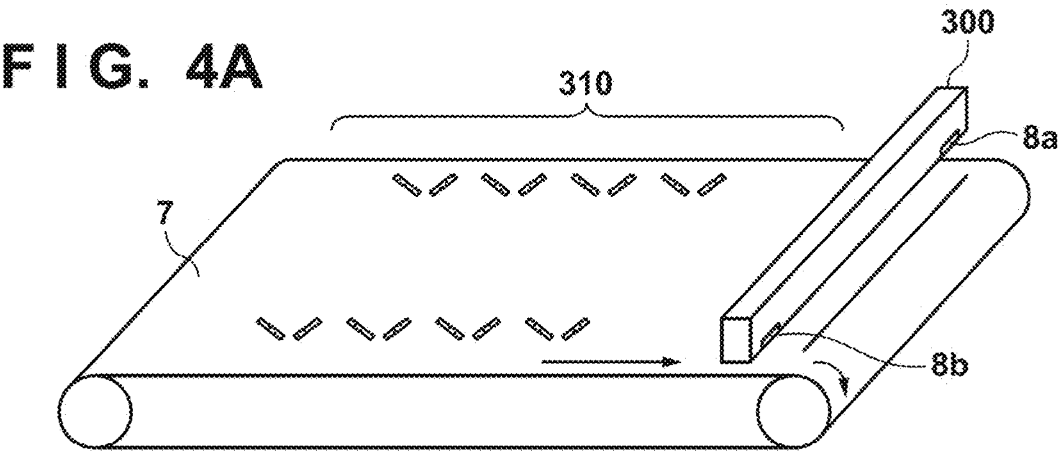
FIGS. 4A and 4B are diagrams illustrating a test image.
Figure 4B:
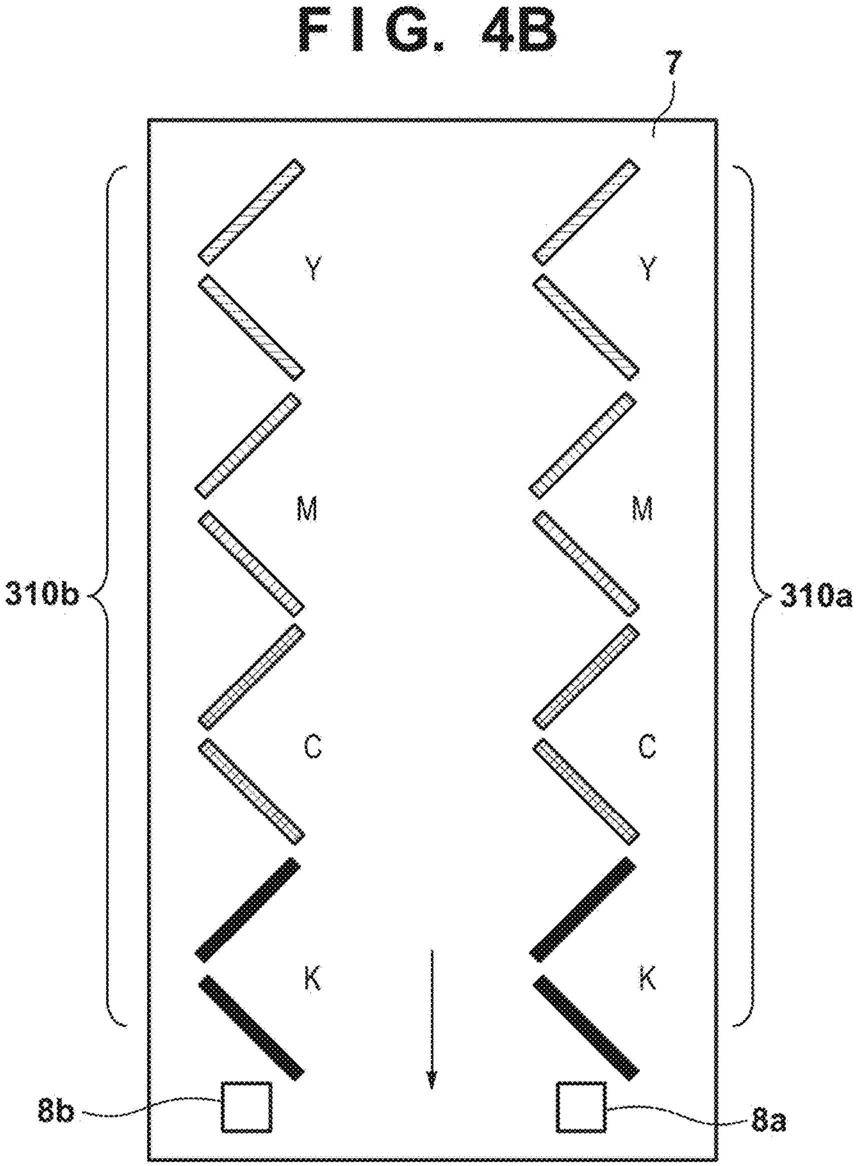

FIG. 4A is a perspective view illustrating the relationship between the test image 310 and the optical sensor 8. FIG. 4B is a plan view illustrating the relationship between the test image 310 and the optical sensor 8. Here, two optical sensors 8 are provided, which will be referred to as optical sensors 8*a* and 8*b*. The optical sensors 8*a* and 8*b* have the same structure.

Each of Y, M, C, and K test images 310 formed on the intermediate transfer member 7 includes line-shaped or parallelogram images. As illustrated in FIG. 4B, a test image 310*a* is formed near one end of the surface of the intermediate transfer member 7, and is formed by the optical sensor 8*a*. A test image 310*b* is formed near the other end of the surface of the intermediate transfer member 7, and is formed by the optical sensor 8*b*. As such, a single image in the test image 310*a* and a single image in the test image 310*b* serve as a pair for obtaining a shift amount of magnification in the main scanning direction. In other words, whether the image is enlarged or reduced in the main scanning direction is determined based on the shift amount and direction of one image in the test image 310*a* and the shift amount and direction of one image in the test image 310*b*.

Figure 5:
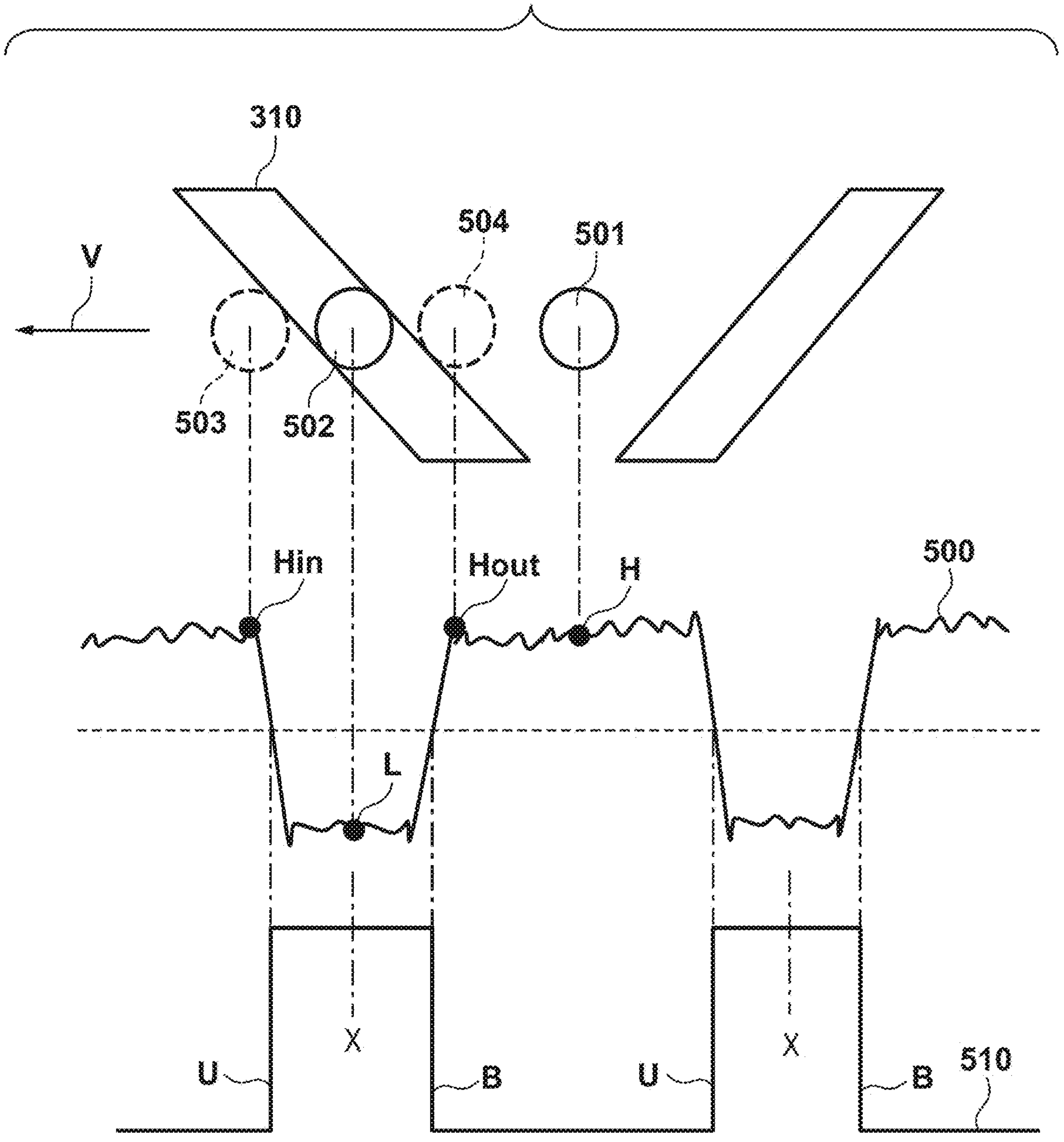
FIG. 5 is a diagram illustrating a relationship between a test image and a light spot.

FIG. 5 is a diagram illustrating detection signals (an analog signal 500 and a digital signal 510) output by the optical sensor 8 that has detected the test image 310. It is assumed here that the reflectance of the intermediate transfer member 7 is higher than the reflectance of the test image 310.

Spots 501 to 504 are light spots formed on the surface of the intermediate transfer member 7 by the light output from the light-emitting element 301. The shape of the test image 310 is a parallelogram. In this example, the two short sides of the test image 310 are parallel to a travel direction V of the intermediate transfer member 7 (a movement direction of the test image 310). The two long sides of the test image 310 are slanted relative to the travel direction V. The main scanning direction is orthogonal to the travel direction V. As such, the long sides are slanted relative to the main scanning direction and the travel direction V. The angle of the slant is 45 degrees, for example. Such a test image 310 may be called a "diagonal patch".

The spot 501 is a light spot formed on the surface of the intermediate transfer member 7. At this time, the voltage of the analog signal 500 is H. The spot 502 is a light spot formed on the test image 310. At this time, the voltage of the analog signal 500 is L (L<H). The spot 503 is a light spot immediately before the test image 310 starts being detected. The voltage of the analog signal 500 corresponding thereto is Hin (Hin>L). The light spot gradually overlaps with the test image 310, and the amount of reflected light from the light spot gradually decreases. The voltage of the analog signal 500 gradually decreases as a result. The spot 504 is a light spot immediately after the test image 310 finishes being detected. At this time, the voltage of the analog signal 500 is Hout (Hout>L). The surface area of the overlap between the light spot and the test image 310 gradually decreases, and the amount of reflected light from the light spot gradually increases. The voltage of the analog signal 500 gradually increases as a result.

The analog signal 500 output from the optical sensor 8 is converted into the digital signal 510 based on a predetermined threshold. The timing at which a rising edge U of the digital signal 510 is detected and the timing at which the position of a falling edge B is detected are measured, and a position X of the test image 310 is calculated based on these timings. The position X is the center between the rising edge U and the falling edge B, for example.

Figure 6:
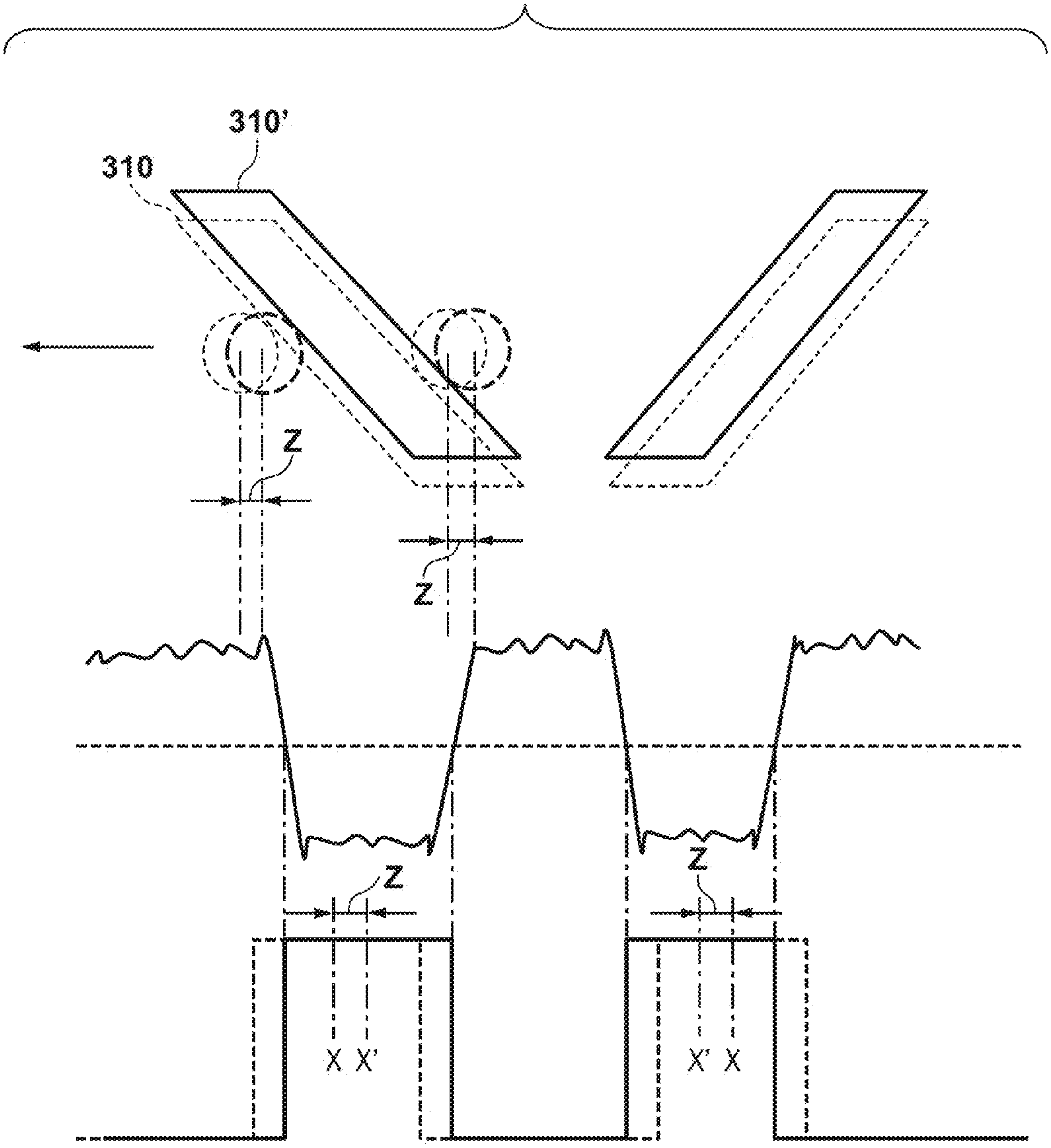
FIG. 6 is a diagram illustrating a relationship between a test image and a light spot.

FIG. 6 is a diagram illustrating a state where the position where the test image 310 is formed is shifted from a nominal position. The test image 310 corresponds to a test image formed at a nominal position. A test image 310' corresponds to a test image formed at the position shifted from the nominal position. Compared to the timing at which the optical sensor 8 detects the test image 310 formed at the nominal position, the timing at which the optical sensor 8 detects the test image 310' formed at the shifted position is shifted by an amount represented by Z. In other words, in FIG. 6, Z represents the shift amount. Z is a difference (distance) between the position X and a position X'. Here, the position X indicates the nominal position, and the position X' indicates the position where the test image 310' is formed.

(4) Control System

Figure 7:
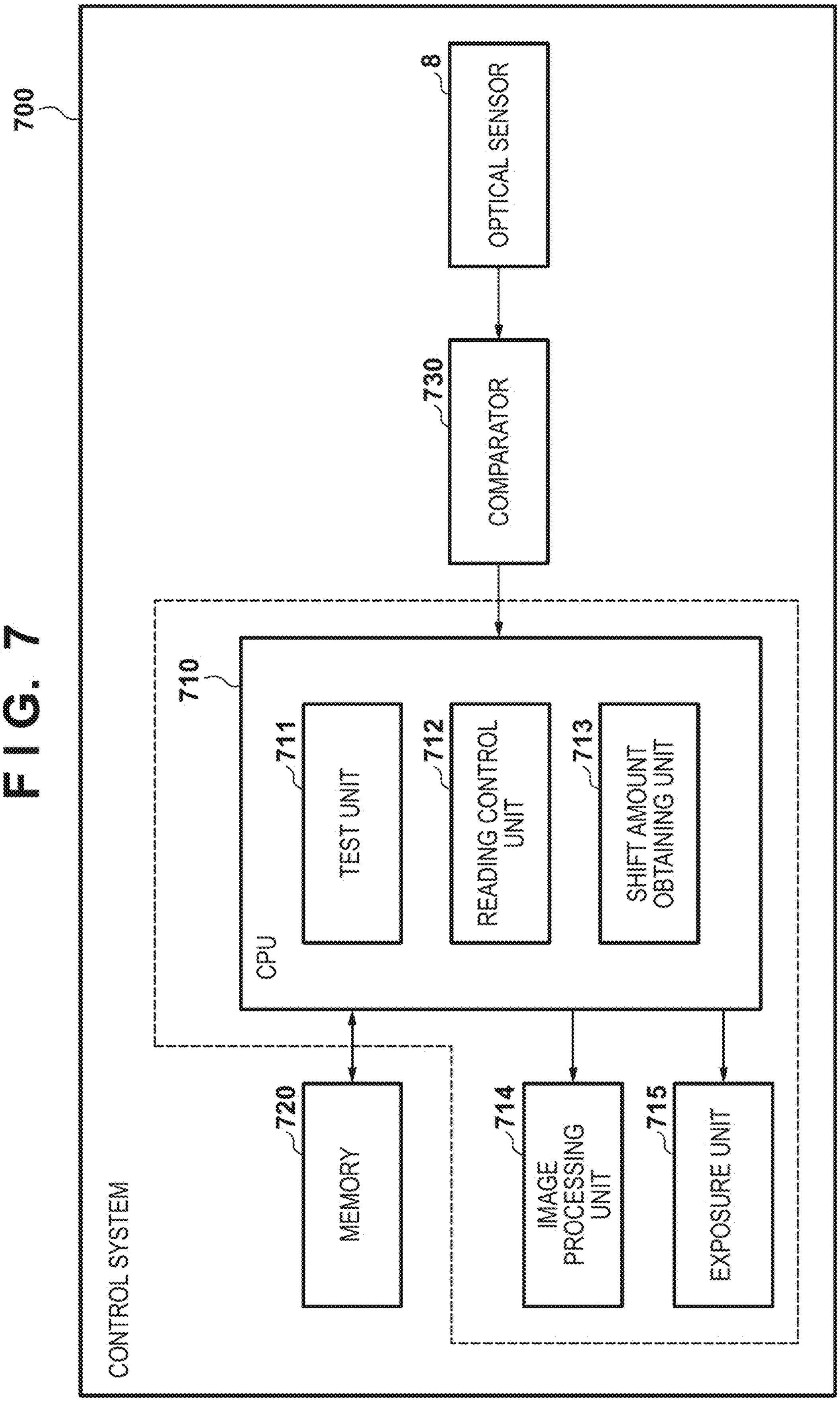
FIG. 7 is a diagram illustrating a control system.

FIG. 7 illustrates a control system 700 of the image forming apparatus 100. The control system 700 includes a CPU 710, an image processing unit 714, an exposure control unit 715, a memory 720, and a comparator 730. The CPU 710 controls the image forming apparatus 100 according to a control program stored in a ROM region of the memory 720. The CPU 710 realizes a test unit 711, a reading control unit 712, and a shift amount obtaining unit 713 by executing a control program. Note that the image processing unit 714 and the exposure control unit 715 may be realized by the CPU 710 as well.

The comparator 730 is a binarization circuit that generates the digital signal 510 by binarizing the analog signal 500 output by the optical sensor 8, and outputs the digital signal 510 to the CPU 710. A threshold may be used for the binarization. As illustrated in FIG. 5, if the voltage of the analog signal 500 is at least the threshold, the level of the digital signal 510 is determined to be Low. If the voltage of the analog signal 500 is less than the threshold, the level of the digital signal 510 is determined to be High.

The test unit 711 generates image data corresponding to the test image 310 and outputs the image data to the image processing unit 714. The image processing unit 714 corrects image data corresponding to a user image (a desired image prepared by a user) or image data corresponding to the test image 310 according to the shift amount Z, and outputs the corrected image data to the exposure control unit 715. The shift amount Z is obtained from the memory 720. The exposure control unit 715 generates an image signal according to the image data output from the image processing unit 714, and outputs the image signal to the exposure device 3. The reading control unit 712 turns on the light-emitting element 301 to irradiate the test image 310 with light, and causes the light-receiving element 302 to receive the reflected light from the test image 310. The reading control unit 712 passes the digital signal 510, which is the reading result for the test image 310 output from the comparator 730, to the shift amount obtaining unit 713. The shift amount obtaining unit 713 measures the timings of the rising edge U and the falling edge B of the digital signal 510, and obtains the midpoint of these timings as the formation position of the test image 310. The rising edge U is the timing at which the level of the digital signal 510 changes from Low to High. The falling edge B is the timing at which the level of the digital signal 510 changes from High to Low.

The shift amount obtaining unit 713 calculates the difference of a measured position X' with respect to the nominal position X (the shift amount Z). Note that the shift amount Z is a numerical value having a sign. The shift amount Z is obtained individually for each of Y, M, C, and K. The shift amount obtaining unit 713 obtains a shift amount Za and a shift amount Zb for the test image 310*a* and the test image 310*b*, respectively. The shift amount Z (the shift amount Za and the shift amount Zb) is stored in a RAM region of the memory 720. The shift amount Z is updated in this manner.

When power is supplied to the image forming apparatus 100 from a commercial power source and the image forming apparatus 100 is started up, the CPU 710 reads out the shift amount Z from the memory 720 and sets that shift amount Z in the image processing unit 714. The image processing unit 714 corrects image shift by executing image processing on the image data based on the shift amount Z.

(5) Correction Method (5-1) Basic Concept of Correction

Figure 8:
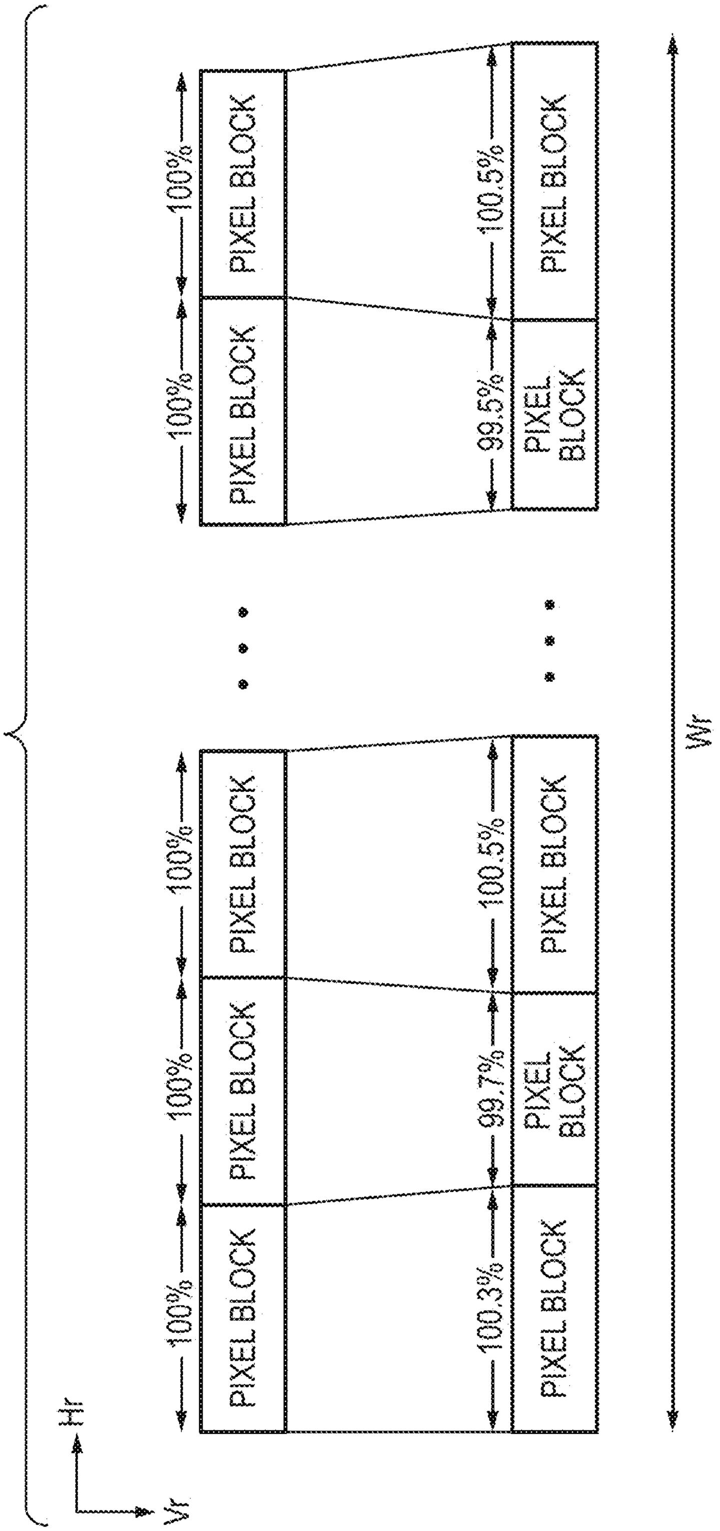
FIG. 8 is a diagram illustrating main scanning magnification.

FIG. 8 illustrates magnification properties of the exposure device 3 in the main scanning direction. In FIG. 8, a region of the image data in the width direction is indicated by Wr. Hr indicates the main scanning direction of the image. Vr indicates the sub scanning direction. Generally speaking, the image data is constituted by a pixel group having n rows×m columns (a bit data group/collection). In other words, there are m pixels in each row. In this example, each row is formed from a plurality (j) of pixel blocks. A single pixel block is formed from h pixels. For example, j is 32 and his 1024. Note that the image data may be constituted by multivalue pixels, or may be constituted by binary pixels.

Two rows of pixels are illustrated in FIG. 8, with the upper row indicating the magnification of each pixel block when the magnification properties of the exposure device 3 are ideal. As illustrated in FIG. 8, the magnification of each of these pixel blocks is 100%.

The lower row indicates the actual magnification properties of the exposure device 3. The magnification of each pixel block varies between 99.5% and 100.5%. If the magnification of a certain pixel block is less than 100%, that pixel block will be reduced. If the magnification of a certain pixel block is greater than 100%, that pixel block will be enlarged. This causes the length of the row (one main scanning line) to be longer or shorter than a nominal length. Note that the main scanning magnification for each pixel block will be called a "partial magnification". The main scanning magnification per main scanning line will be called an "overall magnification". When the actual length is 0.1% longer than the nominal length, that magnification is expressed as 100.1%. The image processing unit 714 corrects the image data at least such that the overall magnification is 100%.

Figure 9:
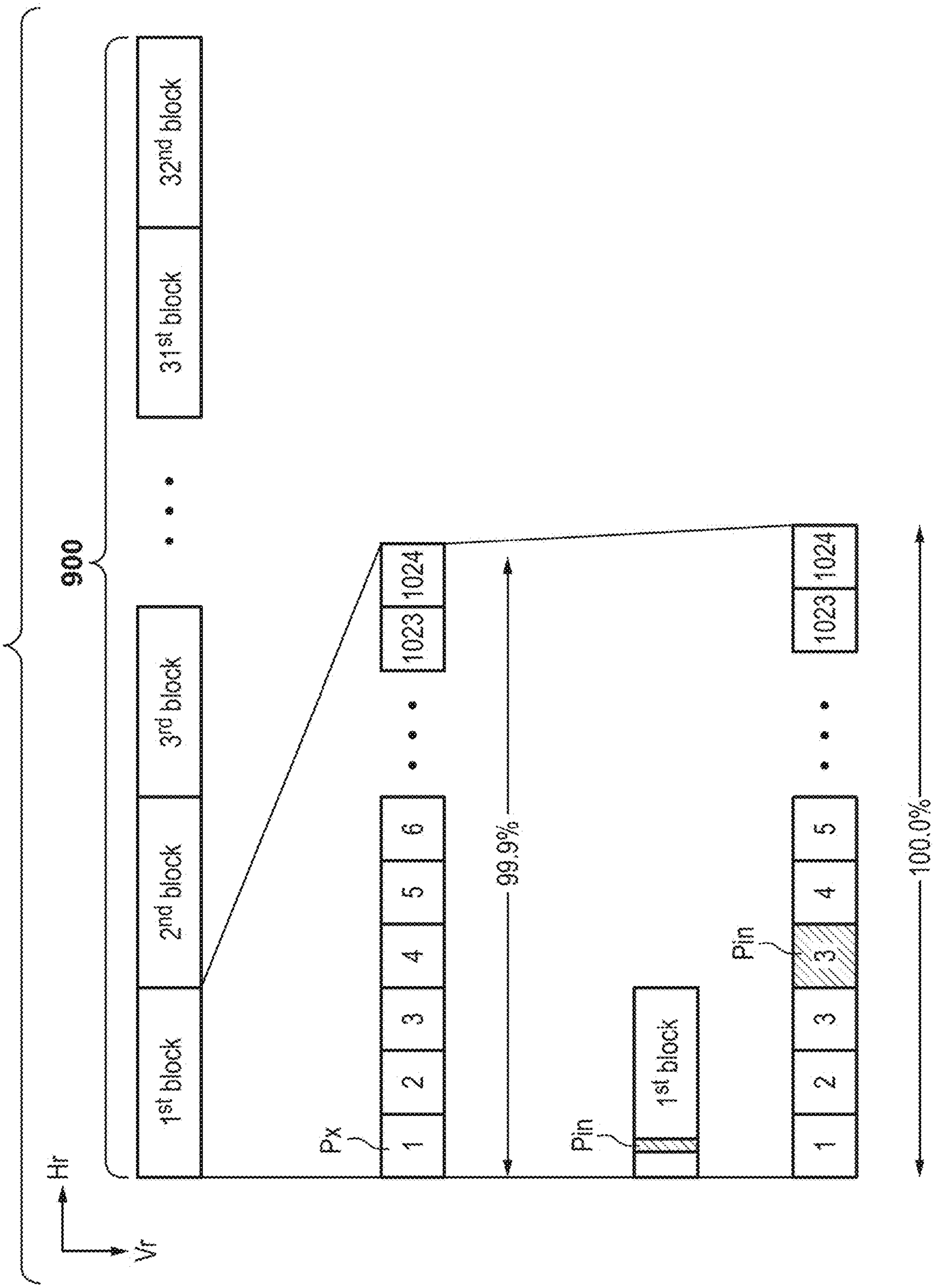
FIG. 9 is a diagram illustrating a method for correcting main scanning magnification.

FIG. 9 illustrates an example of a plurality of pixels that form the image data. In this example, one row of image data 900 is formed from 32 pixel blocks (j=32). In addition, one pixel block is formed from 1024 pixels (h=1024).

The irradiation positions of the light output from the light-emitting elements 205 of the exposure device 3 are measured during the process for manufacturing the exposure device 3. Note that in an LED-type exposure device 3, a single light-emitting element 205 corresponds to a single pixel Px. A main scanning length is measured for each of the 32 pixel blocks, and a magnification with respect to the nominal length (the partial magnification) is calculated.

FIG. 9 assumes that the magnification of the first pixel block is 99.9%. In this case, the number of pixels equivalent to 0.1% is calculated. A pixel Pin is inserted at any desired location in the first pixel block. Doing so corrects the partial magnification of the first pixel block to 100.0%. Note that the pixel value of the inserted pixel is obtained through interpolation from the pixel values of the pixels located before and after the inserted pixel.

(5-2) Algorithm

First, a numerical value called an "insertion span Ssp" is defined.

$$Ssp = 1 \div (\text{magnification} - 1) \quad \text{Eq. 1}$$

The insertion span Ssp indicates the number of pixels for which a single pixel should be inserted when the pixel is inserted into the pixel block. For example, pixels are inserted at even intervals across the entire main scanning direction. This ensures that the locations where the pixels are inserted are balanced. When the overall magnification is enlarged to 100.1% by the correction, the insertion span Ssp is calculated as follows.

$$Ssp = 1 \div (1.001 - 1) = 1000 \quad \text{Eq. 2}$$

This means that one pixel is inserted every 1000 pixels. Equation 3 is an expression for finding the number of pixels to be inserted for each pixel block.

$$Ci = \text{Round}(1024 \times i \div Ssp) - \text{Round}(1024 \times (i - 1) \div Ssp) \quad \text{Eq. 3}$$

Here, i is an index indicating the number of the pixel block. For example, the number of inserted pixels in the first pixel block is denoted as C1. The number of inserted pixels in the second pixel block is denoted as C2. Round(x) is a function for calculating a numerical value by rounding off numbers below the decimal point of x. The number of inserted pixels C2 in the second pixel block is calculated as follows.

$$C2 = \text{Round}(1024 \times 2 \div 1000) - \text{Round}\,(1024 \times (i - 1) \div 1000) = \text{Round}\,(2.048) - \text{Round}\,(1.024) = 1 \quad \text{Eq. 4}$$

When the number of pixels in each pixel block is 1024 pixels and the overall main scanning magnification is enlarged to 100.1%, one pixel is inserted every 1000 pixels. In addition, one pixel is inserted into the second pixel block. A number of inserted pixels Ci in an i-th pixel block is obtained in this manner. Note that the positions at which the Ci pixels are inserted in the i-th pixel block are determined at random.

Figure 10:
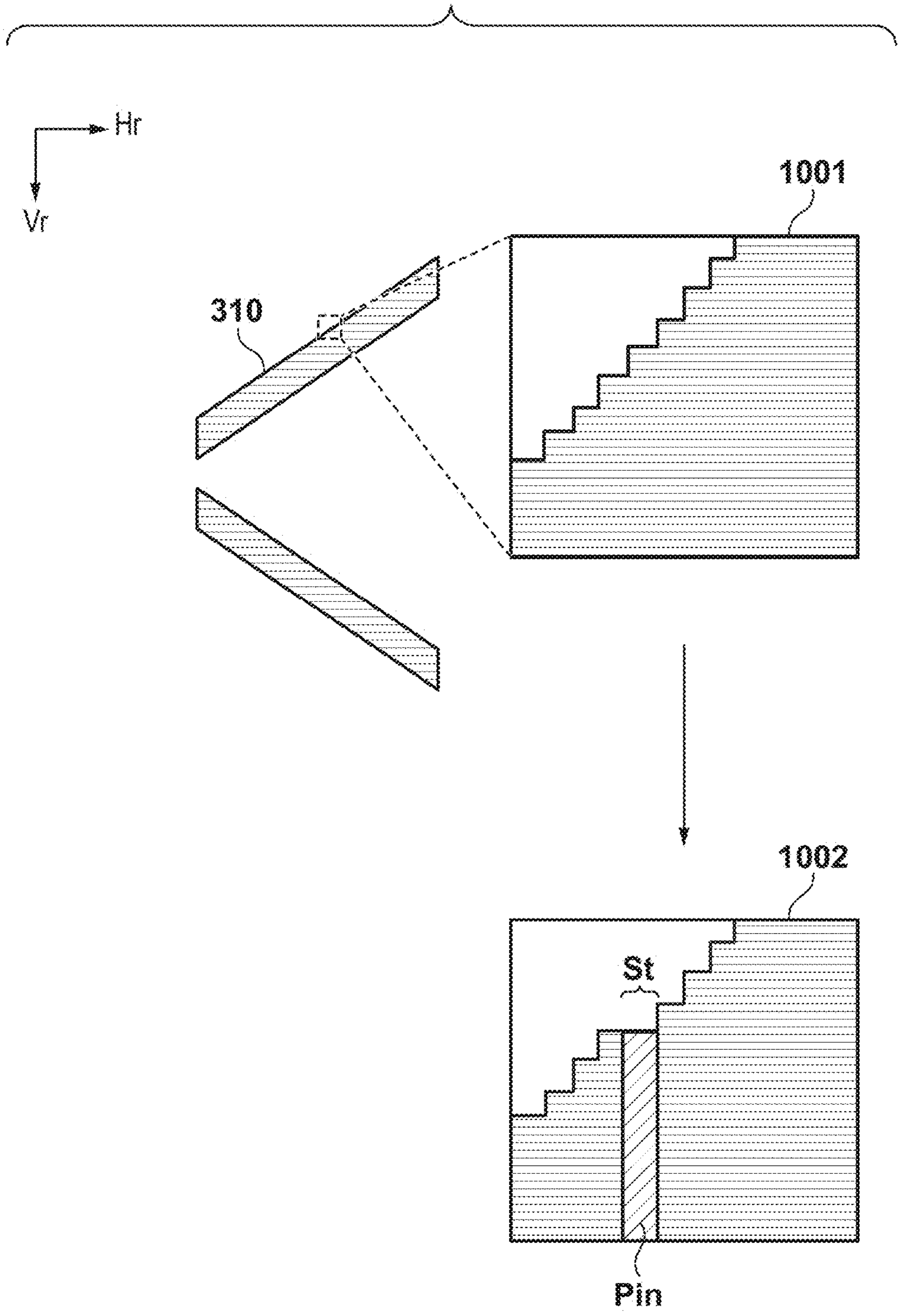
FIG. 10 is a diagram illustrating a step part produced in a test image by pixels being inserted.

(6) Method for Reducing Step Parts Produced by Magnification Correction (6-1) Step Part FIG. 10 is a diagram illustrating a step part generated in the test image 310 by the magnification correction. Enlarged views 1001 and 1002 are diagrams in which a part of the test image 310 formed on the surface of the intermediate transfer member 7 is illustrated in an enlarged manner. In particular, the enlarged view 1001 illustrates a case where the pixel Pin is not added through magnification correction. The enlarged view 1002 illustrates a case where the pixel Pin is added through magnification correction. Adding the pixel Pin produces a step part St in the test image 310.

In a laser scanner-type device, pixels can be inserted and removed in units of 0.5 μm, for example. Assuming that the main scanning length of one pixel is 10 μm, it is therefore possible to insert and remove pixels in units of 1/20 pixels. Furthermore, in a laser scanner-type device, the width of a single pixel can be increased or reduced with ease by adjusting the exposure time (scanning time) of a single pixel. This scanning time can be adjusted by instantaneously increasing/reducing the duration (period) of a control signal called an "image clock".

On the other hand, in an LED-type device, the surface area of the light-emitting surface of the LED is the smallest unit of the light spot. For this reason, the spot diameter in an LED-type device is larger than the spot diameter in a laser scanner-type device. If the main scanning length of one pixel is 10 μm, the magnification is corrected in units of 10 μm. The step part St in an LED-type device can therefore become more pronounced than the step part in a laser scanner-type device.

Figure 11:
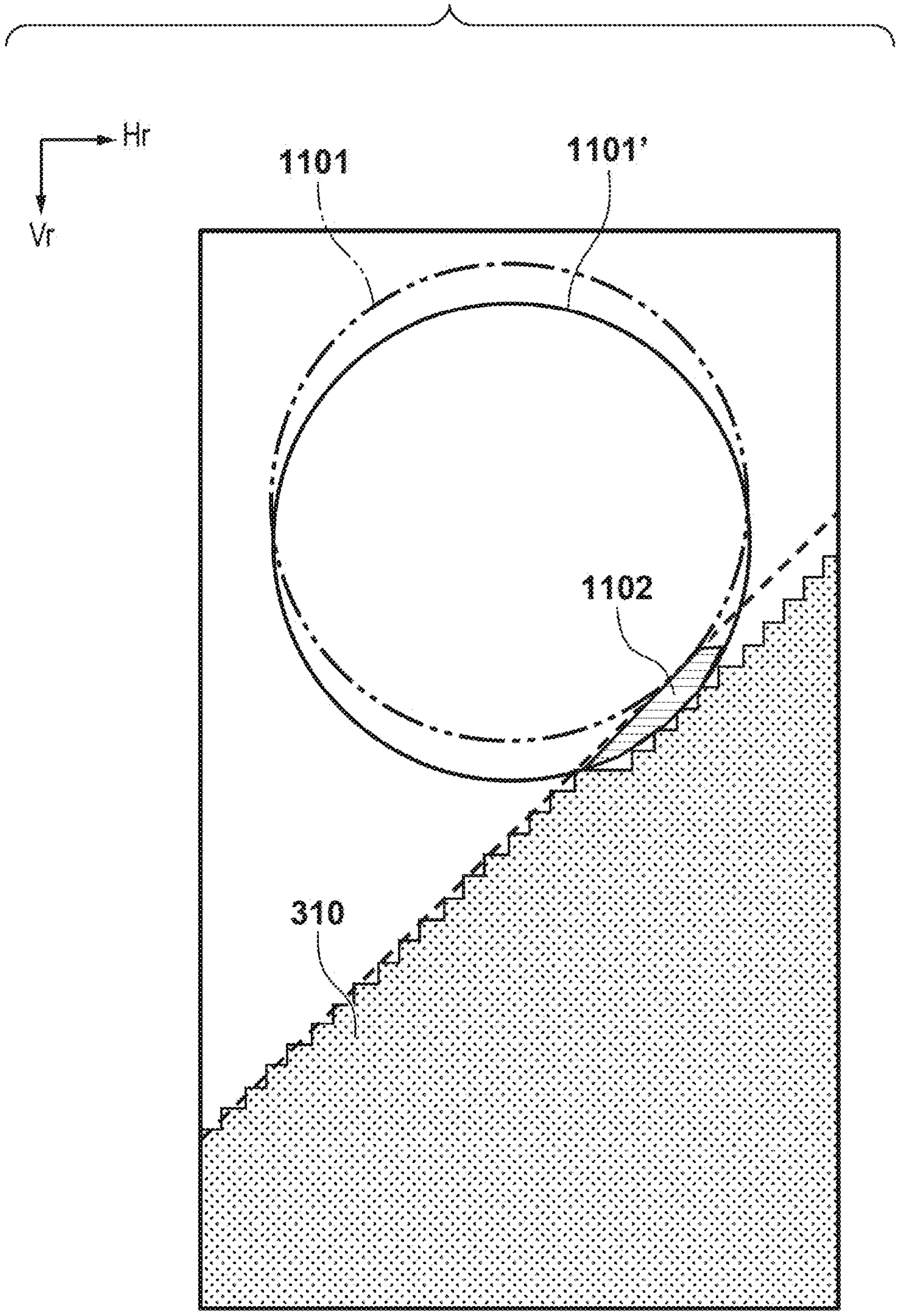
FIG. 11 is a diagram illustrating a drop in detection accuracy due to a step part.

FIG. 11 illustrates the effect of the step part St on the position detection accuracy. A spot 1101 is a spot immediately before the optical sensor 8 detects the test image 310 into which the pixel Pin is not inserted. A spot 1101' is a spot immediately before the optical sensor 8 detects the test image 310 into which the pixel Pin is inserted. Due to the step part St, the spot 1101' is delayed with respect to the nominal spot 1101 by a length of time corresponding to a region 1102, and overlaps with an edge of the test image 310. In other words, the timing of the rising edge U is later than the nominal timing.

Figure 12:
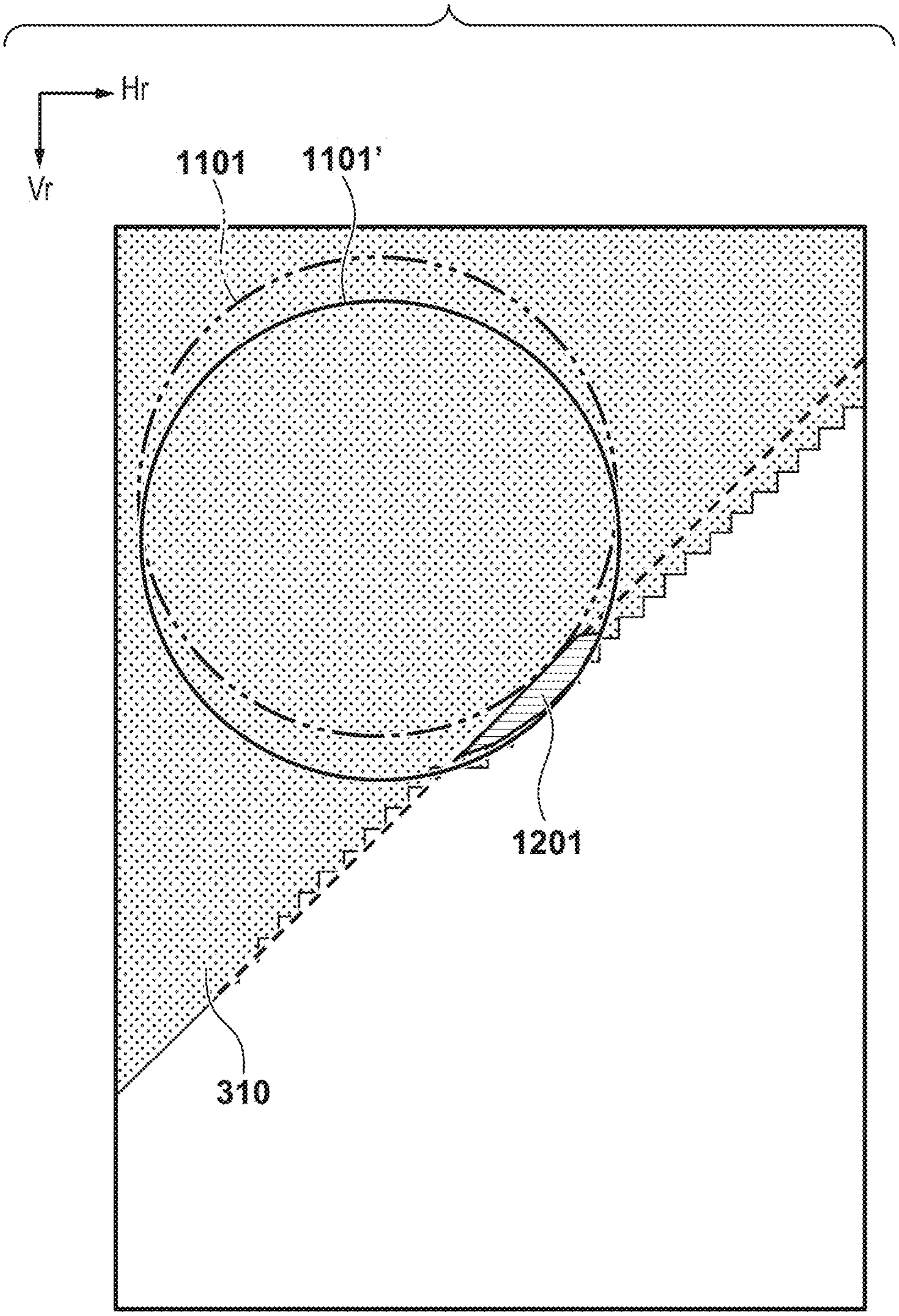
FIG. 12 is a diagram illustrating a drop in detection accuracy due to a step part.

FIG. 12 illustrates the timing at which the spots 1101 and 1101' begin to exit the test image 310. A region 1201 is produced by the step part St. The spot 1101' begins to exit the test image 310 having been delayed with respect to the nominal spot 1101 by a length of time corresponding to the region 1201. In other words, the timing of the falling edge B is later than the nominal timing.

Figure 13A:
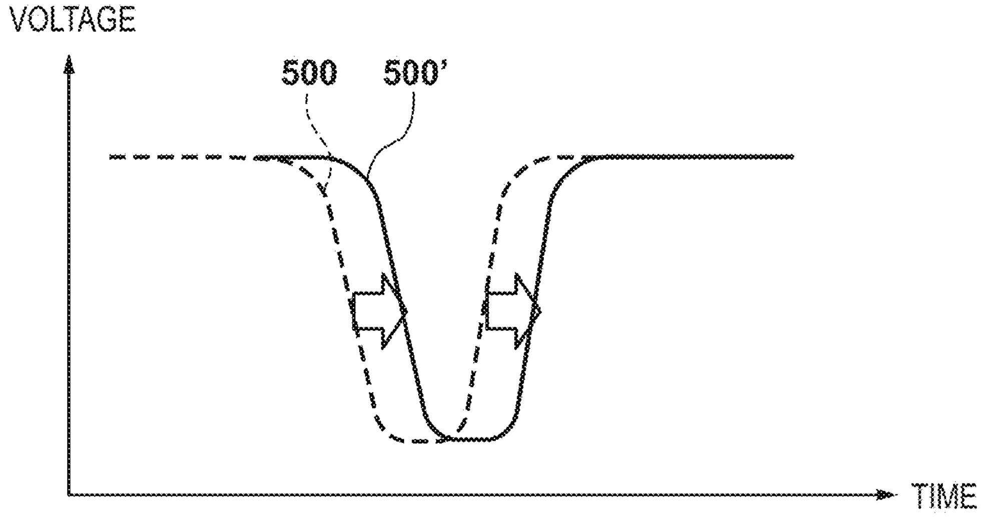
FIGS. 13A and 13B are diagrams illustrating a drop in detection accuracy due to a step part.

FIG. 13A illustrates the analog signal 500 produced by the spot 1101, and an analog signal 500' produced by the spot 1101'. The analog signal 500' is delayed with respect to the analog signal 500.

Figure 13B:
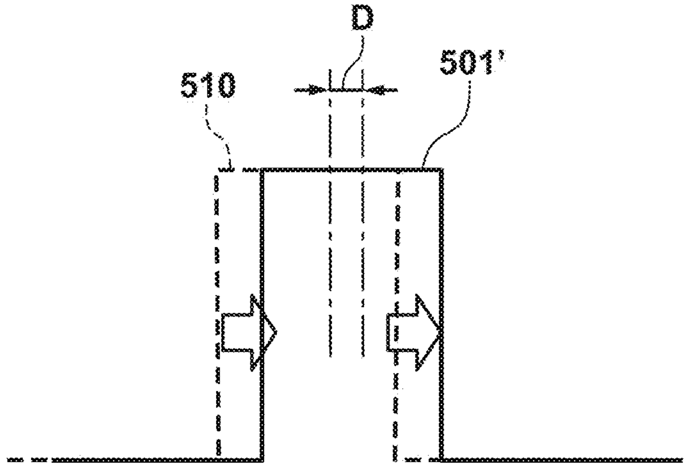

FIG. 13B illustrates the digital signal 510 produced by the spot 1101, and a digital signal 510' produced by the spot 1101'. The digital signal 510' is delayed with respect to the digital signal 510. D represents the difference between the center of the digital signal 510' and the center of the digital signal 510. In other words, the difference D indicates error in the detection position. It can therefore be seen that if the magnification of the test image 310 is corrected, the detection accuracy for the test image 310 will drop. The detection result of the test image 310 can be used not only for magnification correction, but also for color shift correction and the correction of geometric characteristics (e.g., right angles in the image). The correction accuracy for these image forming positions can therefore drop.

(6-2) Reduction Method

Figure 14A:
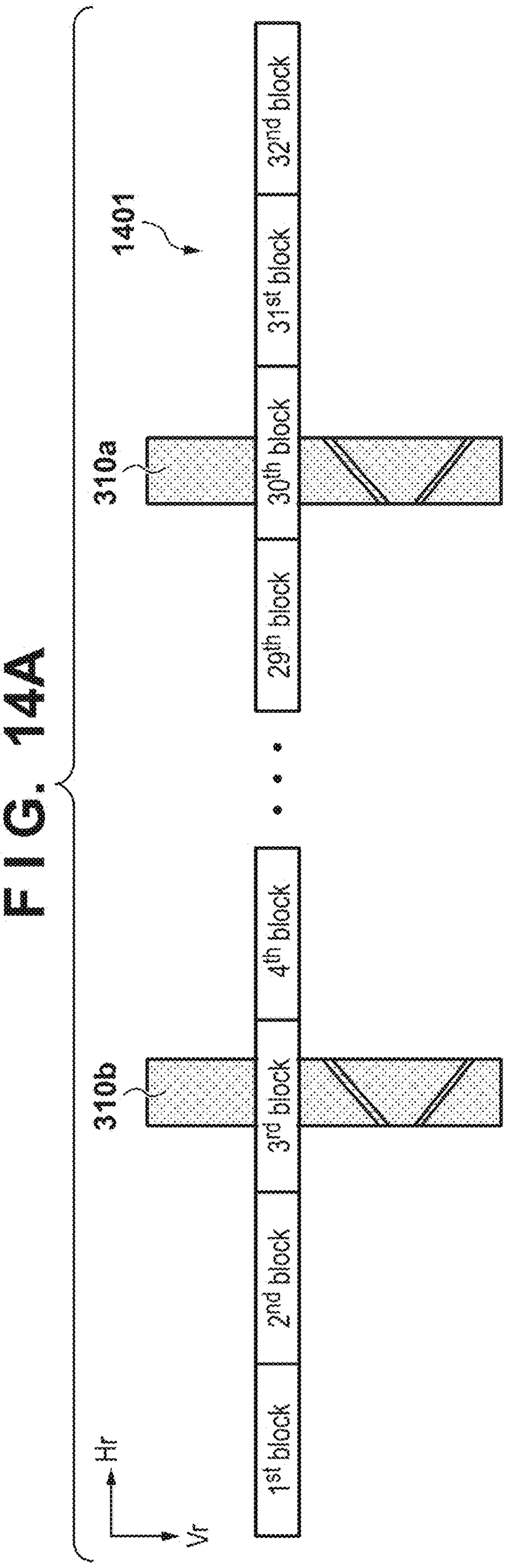
FIGS. 14A and 14B are diagrams illustrating an error reduction method.
Figure 14B:
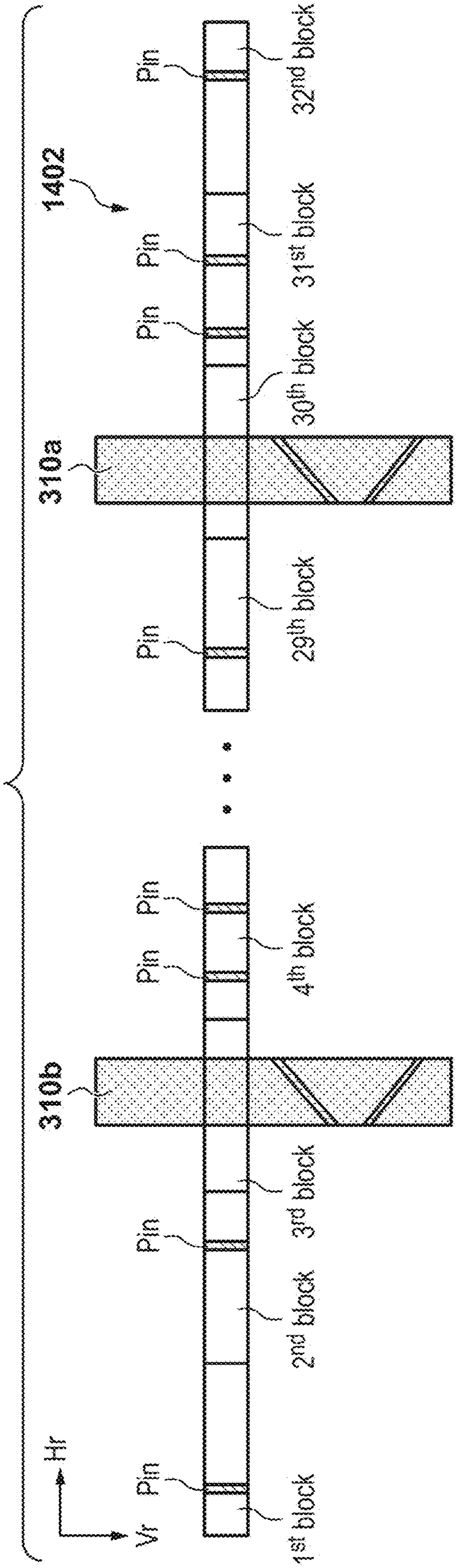

FIG. 14A illustrates a relationship between one row's worth of image data 1401 and the test image 310. FIG. 14B illustrates a relationship between the one row's worth of image data 1401 and the test image 310 when a method for reducing the step part St is applied.

In this example, the pixel region of the test image 310*b* is present in the third pixel block, and the pixel region of the test image 310*a* is present in the 30th pixel block. Accordingly, the CPU 710 or the image processing unit 714 specifies the pixel block in which the test image 310 is formed in the 32 pixel blocks, and suppresses the insertion and removal of pixels in the specified pixel block. In other words, the CPU 710 or the image processing unit 714 specifies the pixel block in which pixels are inserted or removed in the 32 pixel blocks, and determines whether that pixel block includes pixels of the test image 310*b*. If the specified pixel block includes pixels of the test image 310*b*, the CPU 710 or the image processing unit 714 inserts or removes pixels in another pixel block different from the specified pixel block. The specific algorithm is as follows.

A block number Bpc is the number of the pixel block in which the pixels of the test image 310 are present. The block number Bpc is specified by the CPU 710 or the image processing unit 714 analyzing the image data of the test image 310. The number of pixels inserted in the i-th pixel block is represented by Ci. i is an integer from 1 to 32, for example.

When i is equal to Bpc:

$$Ci = 0 \qquad \text{Eq. 5}$$

When i is equal to Bpc−1:

$$Ci = \mathrm{Round}[1024 \times n \div Ssp] - \mathrm{Round}[1024 \times (i-1) \div Ssp] + Rounddown\{[\mathrm{Round}[1024 \times (i+1) \div Ssp] - \mathrm{Round}[1024 \times n \div Ssp]\} \div 2\} \qquad \text{Eq. 6}$$

Here, Rounddown (x) is a function for calculating a numerical value by rounding down numbers below the decimal point of x.

When i is Bpc+1:

$$Ci = \mathrm{Round}[1024 \times i \div Ssp] - \mathrm{Round}[1024 \times (i-1) \div Ssp] + \mathrm{Roundup}\{\{\mathrm{Round}[1024 \times (i-1) \div Ssp] - \mathrm{Round}[1024 \times (i-2) \div Ssp]\} \div 2\} \qquad \text{Eq. 7}$$

Here, Roundup (x) is a function for calculating a numerical value by rounding up numbers below the decimal point of x.

When i is a different number:

$$Ci = \mathrm{Round}(1024 \times i \div Ssp) - \mathrm{Round}(1024 \times (i-1) \div Ssp) \qquad \text{Eq. 8}$$

When the third pixel block and the 30th pixel block overlap with the test image 310, Ci is as follows.

C3 and C30 are 0.

$$C2 = 2 - 1 + Rounddown[(3-2) \div 2] = 1$$

$$C4 = 4 - 3 + \mathrm{Roundup}[(3-2) \div 2] = 2$$

-continued $$C29 = 29 - 28 + Rounddown[(30-29) \div 2] = 1$$

$$C31 = 31 - 30 + \mathrm{Roundup}[(30-29) \div 2] = 2$$

The number of inserted pixels Ci in the remaining pixel blocks are calculated as 1 through Equation 8.

Figures 15, 16:
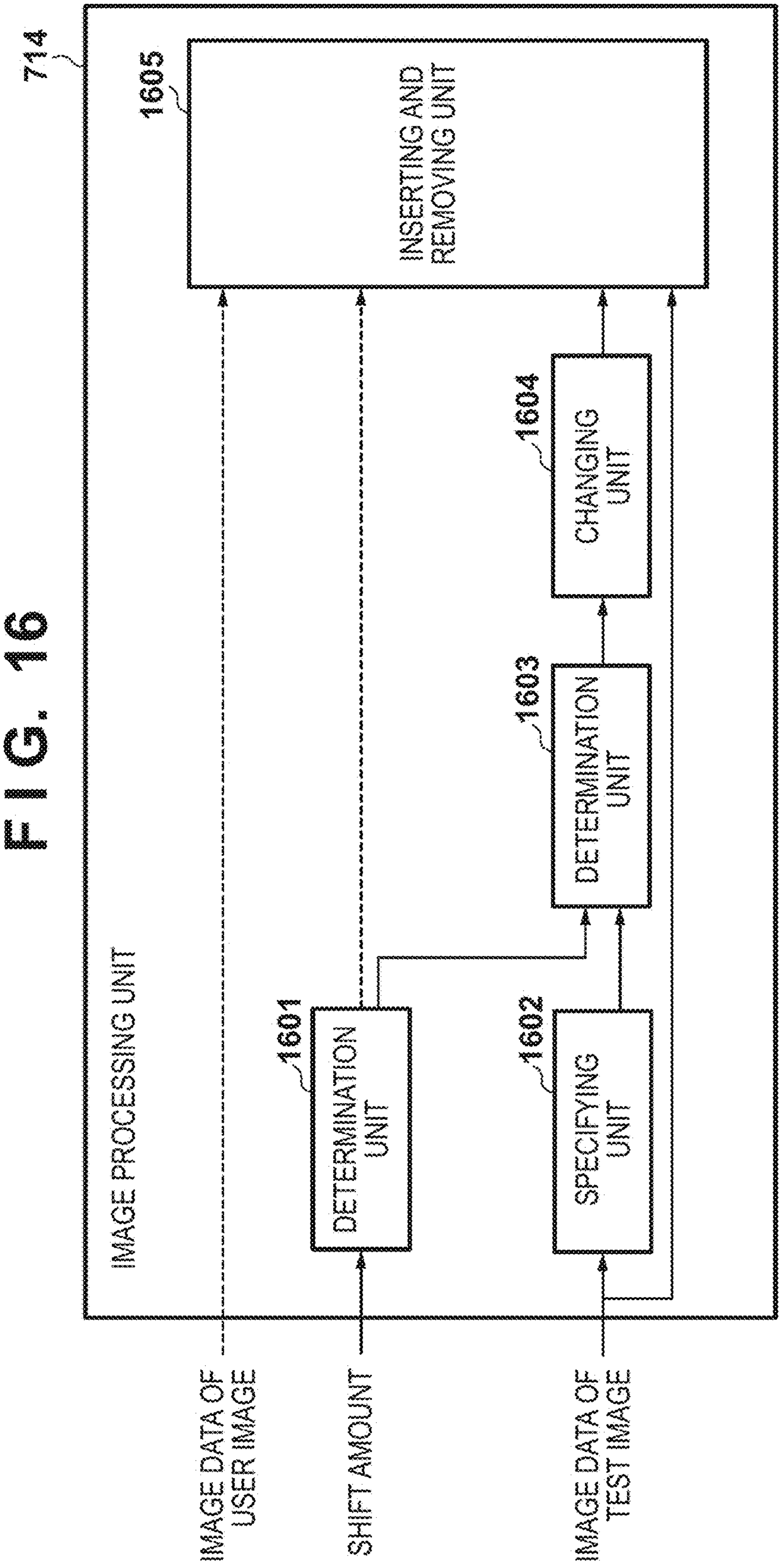
FIG. 15 is a diagram illustrating an example of the insertion of pixels.
FIG. 16 is a diagram illustrating an image processing unit.

FIG. 15 illustrates the number of inserted pixels Ci in each pixel block from the first pixel block to the 32nd pixel block. The insertion of pixels is suppressed in the third pixel block and the 30th pixel block that overlap with the test image 310. In other words, if a certain pixel block overlaps with the test image 310 as illustrated in FIG. 14B, a pixel Pin is assigned to the pixel block adjacent to the stated pixel block.

Although the embodiment has described the insertion of pixels, a similar algorithm is applied for the number of pixels to be removed. In other words, if a certain pixel block overlaps with the test image 310, pixels are removed in another pixel block different from the stated pixel block (e.g., an adjacent pixel block). When pixels are removed, a removal span Dsp is used instead of the insertion span Ssp.

$$Dsp = 1 \div (1 - \text{magnification}) \qquad \text{Eq. 9}$$

In this manner, the insertion span Ssp in the algorithm described above is replaced with the removal span Dsp.

According to the present embodiment, pixels for correcting the main scanning magnification are inserted or removed while avoiding pixel blocks that overlap with the test image 310. This improves the accuracy at which the optical sensor 8 detects the test image 310. In other words, the accuracy of the correction of the image forming position based on the test image 310 is improved. For example, the accuracy at which color shift and geometric characteristics of an image are corrected, such as the accuracy at which the main scanning magnification is corrected, is improved.

(6-3) Function Blocks

FIG. 16 illustrates functions of the image processing unit 714. Note that some or all of the functions of the image processing unit 714 may be realized by the CPU 710. However, in either case, the functions are functions of the control system 700.

(6-3-1) Shift Amount Detection (Test Image Formation)

A determination unit 1601 determines a position at which a pixel is to be inserted or removed based on the shift amount Z stored in the memory 720. As described above, the position may be determined in units of pixel blocks.

A specifying unit 1602 reads out the image data of the test image from the memory 720 or receives the image data from the test unit 711, and analyzes the image data to identify the position at which the test image is formed. As described above, the position may be specified in units of pixel blocks.

A determination unit 1603 determines whether the position (pixel block) at which a pixel is to be inserted or removed matches the position (pixel block) at which the test image is formed. If the position (pixel block) at which the pixel is to be inserted or removed matches the position (pixel block) at which the test image is formed, a changing unit 1604 changes the position (pixel block) at which the pixel is to be inserted or removed. The changing unit 1604 prohibits a pixel from being inserted or removed at a position (main scanning position) at which the test image is formed. For example, there are cases where a pixel is inserted or removed, and the test image is formed, at the i-th pixel block. In this case, the changing unit 1604 changes the pixel block in which a pixel is to be inserted or removed to an i+p-th pixel block. According to the algorithm described above, p is +1, but this is merely one example. p may be any of −3 or lower, −2, −1, +1, +2, +3 or higher, or the like. However, it is desirable that the pixel blocks be distributed evenly by inserting or removing pixels in a single row (a single main scanning line).

An inserting and removing unit 1605 inserts or removes the pixel in the pixel block determined from the image data of the test image. Note that the position at which the pixel is to be inserted or removed in the pixel block may be determined at random, for example.

The inserting and removing unit 1605 need not insert or remove bit data in the region corresponding to the test image data in the image data. The image data may include a plurality of regions each having a plurality of bit data in the direction of the rotation axis. The inserting and removing unit 1605 may insert and remove bit data for each of the plurality of regions. The inserting and removing unit 1605 does not insert and remove bit data in a region, among the plurality of regions in the image data, that contains the test image data, and may insert and remove bit data in a region not containing the test image data. Of the plurality of regions in the image data, the number of bit data to be inserted and removed in a region adjacent to the region including the test image data may be greater than the number of bit data to be inserted and removed in a region not adjacent to the region including the test image data.

(6-3-2) Forming User Image

The determination unit 1601 determines a position at which a pixel is to be inserted or removed based on the shift amount Z stored in the memory 720. As described above, the position may be determined in units of pixel blocks.

The inserting and removing unit 1605 inserts or removes the pixel in the pixel block determined from the image data of a user image. Note that the position at which the pixel is to be inserted or removed in the pixel block may be determined at random, for example.

(6-4) Flowchart

Figure 17:
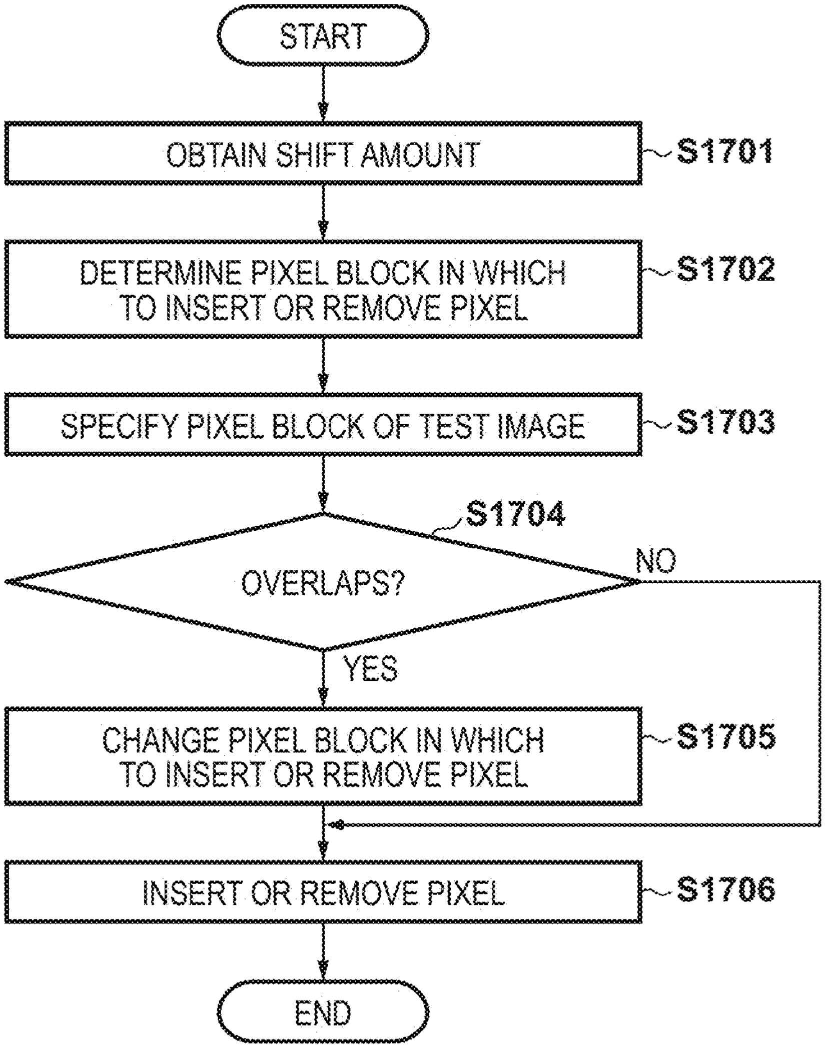
FIG. 17 is a flowchart illustrating a method for inserting or removing pixels.

FIG. 17 illustrates a pixel insertion and removal method executed by the CPU 710 in accordance with the control program. A pixel insertion and removal method for the image data of a test image will be described hereinafter. The following method is executed every main scanning line. When the image data is constituted by a pixel group having n rows×m columns, the following method is executed for each row.

In step S1701, the CPU 710 obtains the shift amount from the memory 720. This shift amount is the most recent shift amount among shift amounts detected in the past.

In step S1702, the CPU 710 (the determination unit 1601) determines, based on the shift amount, a pixel block in which a pixel is to be inserted or removed.

In step S1703, the CPU 710 (the specifying unit 1602) specifies, based on the image data of the test image, a pixel block in which the test image is formed.

In step S1704, the CPU 710 (the determination unit 1603) determines whether the pixel block in which the pixel is to be inserted or removed overlaps with the pixel block in which the test image is formed. If the two do not overlap, the CPU 710 moves from step S1704 to step S1706. If the two overlap, the CPU 710 moves from step S1704 to step S1705.

In step S1705, the CPU 710 (the changing unit 1604) changes the pixel block in which the pixel is to be inserted or removed. The algorithm for the change is as described above.

In step S1706, the CPU 710 (the inserting and removing unit 1605) executes the inserting or removing of the pixel.

(7) Other

The photosensitive drum 1 is an example of a photosensitive member that is rotationally driven. The exposure device 3 is an example of an exposure light source that forms an electrostatic latent image by exposing a surface of the photosensitive member based on image data. The developer 4 is an example of a developing member that forms a toner image by developing an electrostatic latent image using toner. The primary transfer device 5 is an example of a transfer member that transfers the toner image onto a transfer material (e.g., the intermediate transfer member 7 or the sheet P). The optical sensor 8 is an example of a sensor that detects a test image, formed on the transfer material, for obtaining a shift amount in a formation position of the toner image in a second direction that is orthogonal to a first direction, the first direction being a direction in which the transfer material moves. The control system 700 is an example of one or more controllers or one or more processors that correct image data by inserting or removing a pixel in accordance with the shift amount detected by the sensor. The control system 700 inserts or removes the pixel, in accordance with the shift amount, in any pixel region (e.g., the other pixel region), of the image data, that remains after excluding pixel regions in which the test image is formed on the transfer material (e.g., pixel blocks). This reduces detection error of the formation position of the test image in the second direction (the main scanning direction) more than in the past. As illustrated in FIG. 4B, the test images 310*a* and 310*b* are formed only in specific pixel regions on the intermediate transfer member 7, and the remaining pixel regions are blank regions. In this case, the other pixel region is secured in one of the blank regions. Note that the other pixel region may be determined having excluded the detection regions of the optical sensors 8*a* and 8*b*.

The test image may include a line-shaped image that is slanted with respect to the second direction. However, this is merely one example. As long as the test image formed by the image forming unit 6 is a test image in which the image shift can be detected, the line-shaped image may be replaced.

The image data is constituted by a pixel group having n rows×m columns. Each row included in the n rows includes m pixels arranged parallel to the second direction. The foregoing embodiment described an example in which m=1024×32. The control system 700 may be configured to insert k pixels, according to the shift amount, for the m pixels, or to remove k pixels, according to the shift amount, from the m pixels. Note that k is ΣCi (where i is an integer from 1 to m).

The m pixels form j pixel regions (pixel blocks) each constituted by a plurality of pixels. The control system 700 determines, from the j pixel regions, a pixel region in which some (e.g., Ci) of the k pixels according to the shift amount are inserted or removed. When the determined pixel region matches the pixel region in which the test image is formed, the control system 700 changes the pixel region in which the some of the k pixels according to the shift amount are inserted or removed to another pixel region among the j pixel regions. This makes it difficult for the step part St to arise in the test image.

The control system 700 may determine the pixel region in which the some of the k pixels according to the shift amount are to be inserted or removed so as to be distributed among the j pixel regions. The foregoing embodiment described an example in which the number of pixels to be inserted or removed in a certain pixel block is one pixel. However, this is merely one example. In a case where a plurality of pixels are inserted or removed in a pixel block in which the test image is formed, the plurality of pixels are allocated so as to be distributed in the other pixel block. This ensures that the pixels to be inserted or removed are not concentrated in a particular pixel block.

The i-th pixel region among the j pixel regions is determined as the pixel region in which the some of the k pixels according to the shift amount are to be inserted or removed, and there are situations where the i-th pixel region includes pixels of the test image. In this case, the control system 700 may determine an i+1-th pixel region as the pixel region in which the some of the k pixels according to the shift amount are to be inserted or removed.

The i-th pixel block and the i+1-th pixel block may also be pixel regions in which the pixels are to be inserted or removed. In this case, the control system 700 may determine an i+2-th pixel region as the pixel region in which the pixel is to be inserted or removed. This ensures that the pixels to be inserted or removed are not concentrated in a particular pixel block.

There are situations where the i-th pixel region is determined as the pixel region in which the pixel is to be inserted or removed, and includes pixels of the test image. In this case, the control system 700 may determine an i+p-th pixel region as the pixel region in which the pixel is to be inserted or removed. The i+p-th pixel region may be the pixel region closest to the i-th pixel region among remaining pixel regions that are not pixel regions in which the some of the k pixels according to the shift amount are to be inserted or removed. In this manner, a pixel region close to the i-th pixel region may be selected as the other pixel region. Note that i+p is any integer of 1 to j.

The i−1-th pixel region or the i−2-th pixel region may be determined as the other pixel region. This is a case where p=−1 and −2. Note that the i−2-th pixel region may be selected as the other pixel region only when the i−1-th pixel region is already the region in which the pixel is to be inserted or removed.

Note that when p is a positive integer, the other pixel region may be expressed as the i−p-th pixel region. The i−p-th pixel region may be the pixel region closest to the i-th pixel region among remaining pixel regions that are not pixel regions in which the pixel is to be inserted or removed. Note that i−p is any integer of 1 to j.

The test image may include a first test pattern (e.g., the test image 310*b*) and a second test pattern (e.g., the test image 310*a*) disposed at different positions in the second direction. The control system 700 (the CPU 710, the image processing unit 714) may determine that it is necessary to insert or remove a pixel when the first test pattern and the second test pattern are shifted in different directions. For example, there are situations where the distance between the first test pattern and the second test pattern is shorter than a predetermined distance. In this case, the CPU 710 or the image processing unit 714 determines that it is necessary to insert a pixel. There are also situations where the distance between the first test pattern and the second test pattern is longer than a predetermined distance. In this case, the CPU 710 or the image processing unit 714 determines that it is necessary to remove a pixel.

The optical sensor 8*b* is an example of a first optical sensor that detects a first timing at which a first test pattern passes due to the transfer material moving. The optical sensor 8*a* is an example of a second optical sensor that detects a second timing at which the second test pattern passes. The CPU 710 and the shift amount obtaining unit 713 detect the shift amount based on the first timing and the second timing.

As illustrated in FIG. 4B, the first test pattern and the second test pattern that form a pair are parallel to each other.

The exposure device 3 may include a plurality of the light-emitting elements 205 arranged parallel to the rotation axis of the photosensitive member. Each of the plurality of light-emitting elements 205 performs exposure for one of the m pixels. In this manner, in an LED-type device, the light-emitting elements and the pixels correspond one-to-one. However, the exposure device 3 may be a laser scanner type. The plurality of light-emitting elements may be light-emitting diodes. The light-emitting diodes may be organic EL-type light-emitting diodes.

As illustrated in FIG. 4B, the test image may be a parallelogram having two long sides and two short sides. The two long sides are slanted relative to the second direction. The two short sides may be parallel to the second direction. However, the two short sides need not be parallel to the second direction. An angle formed by (a long side of) the test image and the second direction may be 45 degrees.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-101185, filed Jun. 20, 2023 which is hereby incorporated by reference herein in its entirety.

What is claimed is:

1. An image forming apparatus comprising:

a photosensitive member that is rotationally driven;

a first optical sensor and a second optical sensor;

an exposure light source including a plurality of light-emitting units that are arranged parallel to a rotation axis of the photosensitive member and that emit light that exposes the photosensitive member; and at least one controller configured to generate image data that is a group of bit data controlling lighting and extinguishing of the plurality of light-emitting units and that corresponds to an image, and to insert or remove the bit data in the image data, wherein the image includes a test image for obtaining a shift amount in an image formation position relative to a reference position, the test image including a first test pattern and a second test pattern disposed at different positions in a direction of the rotation axis, wherein the image data includes test image data corresponding to the test image, wherein the first optical sensor is configured to detect a first timing at which the first test pattern passes due to a transfer material moving, wherein the second optical sensor is configured to detect a second timing at which the second test pattern passes due to the transfer material moving, wherein the at least one controller is configured to not insert or remove the bit data in a region of the image data that corresponds to the test image data, and wherein the at least one controller is configured to detect the shift amount based on the first timing and the second timing.

2. The image forming apparatus according to claim 1, wherein the test image includes a line-shaped image that is slanted with respect to a direction of the rotation axis.

3. The image forming apparatus according to claim 1, wherein the image data includes a plurality of regions each having a plurality of instances of the bit data in a direction of the rotation axis, and wherein the at least one controller is configured to insert or remove the bit data in each of the plurality of regions.

4. The image forming apparatus according to claim 3, wherein among the plurality of regions in the image data, the at least one controller does not insert and/or remove the bit data in a region that includes the test image data, and inserts and/or removes the bit data in a region that does not include the test image data.

5. The image forming apparatus according to claim 4, wherein, of the plurality of regions in the image data, a total number of instances of the bit data to be inserted or removed in a region adjacent to the region that includes the test image data is greater than a total number of instances of the bit data to be inserted or removed in a region not adjacent to the region that includes the test image data.

6. The image forming apparatus according to claim 1, wherein the test image includes a first test pattern, and a second test pattern disposed at a position different from the first test pattern in a direction of the rotation axis, and wherein the at least one controller is configured to insert or remove a pixel in accordance with a distance between the first test pattern and the second test pattern.

7. The image forming apparatus according to claim 6, wherein the at least one controller is configured to insert a pixel in a case where the distance between the first test pattern and the second test pattern in the direction of the rotation axis is shorter than a predetermined distance.

8. The image forming apparatus according to claim 6, wherein the at least one controller is configured to remove a pixel is removed in a case where the distance between the first test pattern and the second test pattern is longer than a predetermined distance.

9. The image forming apparatus according to claim 1, wherein the first test pattern and the second test pattern are parallel to each other.

10. The image forming apparatus according to claim 1, wherein the plurality of light-emitting elements are light-emitting diodes.

11. The image forming apparatus according to claim 1, wherein the light-emitting diodes are organic electro luminescence type light-emitting diodes.

12. An image forming apparatus comprising:

a photosensitive member that is rotationally driven;

an exposure light source including a plurality of light-emitting units that are arranged parallel to a rotation axis of the photosensitive member and that emit light that exposes the photosensitive member; and at least one controller configured to generate image data that is a group of bit data controlling lighting and extinguishing of the plurality of light-emitting units and that corresponds to an image, and to insert or remove the bit data in the image data, wherein the image includes a test image for obtaining a shift amount in an image formation position relative to a reference position, wherein the image data includes test image data corresponding to the test image, wherein the at least one controller does not insert or remove the bit data in a region of the image data that corresponds to the test image data, wherein the test image is a parallelogram having two long sides and two short sides, wherein the two long sides are slanted relative to a direction of the rotation axis, and wherein the two short sides are parallel to the direction of the rotation axis.

13. The image forming apparatus according to claim 1, wherein an angle formed by the test image and the direction of the rotation axis is 45 degrees.

* * * * *